(12) United States Patent
Oki et al.

(10) Patent No.: US 8,432,256 B2
(45) Date of Patent: Apr. 30, 2013

(54) INFORMATION PROVIDING SERVICE SYSTEM FOR RAILROAD USERS

(75) Inventors: Masao Oki, Tokyo (JP); Tomoya Shirakashi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 370 days.

(21) Appl. No.: 12/745,418

(22) PCT Filed: Nov. 28, 2008

(86) PCT No.: PCT/JP2008/071717
§ 371 (c)(1),
(2), (4) Date: May 28, 2010

(87) PCT Pub. No.: WO2009/072448
PCT Pub. Date: Jun. 11, 2009

(65) Prior Publication Data
US 2010/0308966 A1 Dec. 9, 2010

(30) Foreign Application Priority Data

Dec. 4, 2007 (JP) ................................. 2007-313503

(51) Int. Cl.
*H04Q 5/22* (2006.01)
(52) U.S. Cl.
USPC ........ 340/10.1; 725/36; 455/456.6; 455/3.05; 455/414.4; 705/5; 701/1; 701/500
(58) Field of Classification Search .......... 340/1.1–16.1, 340/10.1, 156, 164, 165; 705/5; 725/36
See application file for complete search history.

(56) References Cited

U.S. PATENT DOCUMENTS

| | | |
|---|---|---|
| 2002/0107916 A1 | 8/2002 | Nii et al. |
| 2006/0170285 A1 | 8/2006 | Morimitsu et al. |
| 2007/0015532 A1 | 1/2007 | Deelman |
| 2007/0072622 A1 | 3/2007 | Ishibashi et al. |
| 2007/0265891 A1* | 11/2007 | Guo ................................. 705/5 |

FOREIGN PATENT DOCUMENTS

| | | |
|---|---|---|
| CN | 1877642 A | 12/2006 |
| CN | 1905717 A | 1/2007 |
| JP | 05-058287 A | 3/1993 |
| JP | 2001-222603 A | 8/2001 |

(Continued)

OTHER PUBLICATIONS

Office Action (Notice on the Second Office Action) dated May 25, 2012, issued in corresponding Chinese Patent Application No. 200880119974.4, and an English Translation thereof. (13 pages).

(Continued)

*Primary Examiner* — Daniel Wu
*Assistant Examiner* — Vishak Ganesh
(74) *Attorney, Agent, or Firm* — Buchanan Ingersoll & Rooney PC

(57) ABSTRACT

To provide an information providing service system for railroad users, which enables provision of appropriate information according to a running status or the like of a train used by railroad users to improve convenience when the railroad users acquire information. A passenger who is holding an IC ticket with a wireless communication function and is on a car can acquire car information held by a train-information management device or information held by a ground system based on the car information held by the train-information management device via wireless communication of the IC ticket, and the passenger can confirm the acquired information on a display screen of the IC ticket.

3 Claims, 4 Drawing Sheets

FOREIGN PATENT DOCUMENTS

| | | | |
|---|---|---|---|
| JP | 2002-127905 | * | 5/2002 |
| JP | 2002-127905 A | | 5/2002 |
| JP | 2003-050847 A | | 2/2003 |
| JP | 2003-143650 | | 5/2003 |
| JP | 2003-173458 A | | 6/2003 |
| JP | 2004-037728 A | | 2/2004 |
| JP | 2004-299416 | | 10/2004 |
| JP | 2005-107589 | * | 4/2005 |
| JP | 2005-107589 A | | 4/2005 |
| JP | 2005-242686 A | | 9/2005 |
| JP | 2006-007873 | | 1/2006 |
| JP | 2007-026165 | | 2/2007 |
| JP | 2007-079928 | | 3/2007 |
| JP | 2007-089131 A | | 4/2007 |
| JP | 2007-283991 A | | 11/2007 |
| RU | 2 206 177 C1 | | 6/2003 |

OTHER PUBLICATIONS

The extended European Search Report dated Jul. 13, 2012, issued in corresponding European Patent Application No. 08857995.8. (8 pages).
Notice of Rejection issued in the corresponding Japanese Patent Application No. 2009-544653 dated Jun. 15, 2010, and an English Translation thereof.
Office Action (Decision on Grant) dated Oct. 17, 2011, issued in the corresponding Russian Patent Application No. 2010127290, and an English Translation thereof.
International Search Report dated Dec. 22, 2008.
Non-English Written Opinion of the International Searching Authority dated Dec. 22, 2008.

* cited by examiner

INFORMATION PROVIDING SERVICE SYSTEM FOR RAILROAD USERS

TECHNICAL FIELD

The present invention relates to a system for performing various information providing services related to a train for passengers on a train and railroad users in a station yard, as well as for train crews and railroad companies.

BACKGROUND ART

Conventionally, there have been proposed various services such as providing information to passengers on a running train. For example, a service for providing information such as news via a display device provided in a car has been practically used.

In Patent Document 1, there is described a service providing system that provides services desired by passengers on a train according to request of the passengers. That is, an in-car server and an in-car terminal connected to the in-car server, which can be operated by a passenger, are provided on a train. Passengers operate the in-car terminal to connect to a ground information providing system through the in-car server and wireless communication, thereby enabling to access service information provided by the information providing system. With this configuration, for example, Internet service, e-mail service, service of route guidance to destination, online shopping service, fare adjustment service, and ticketing service are provided according to requests of passengers. Furthermore, operations can be made not only from the in-car terminal but also from a portable terminal held by a passenger.

In Patent Document 1, a mode in which a card reader capable of reading an ID card, in which ID (personal identification number) information, ticket information, seat reservation information, electronic money information or the like are stored, is provided in a car to provide various services based on the contents of the ID card is also described. For example, when a passenger having an ID card wishes to change his destination station, the passenger can operate the in-car terminal to read the boarding station, original destination station, and card balance stored in the ID card, rewrite the original destination station to the new destination station, and adjust a balance fare by the card balance.

Patent Document 1: Japanese Patent Application Laid-open No. 2001-222603

DISCLOSURE OF INVENTION

Problem to be Solved by the Invention

In the conventional technique described above, however, information provided to passengers is provided based on pieces of information of various servers in the information providing system on the ground and of a railroad traffic control system, and is not provided based on information held by the train in which the passengers are on board. Therefore, for example, when a train timetable becomes disordered at the time of an accident or the like, and a running position of the train cannot be accurately ascertained at the ground side, there is a problem that accurate information cannot be acquired even when passengers try to acquire appropriate information corresponding to the running position of the train.

Furthermore, to receive services, passengers need to operate an in-car terminal or a mobile terminal, and further, an ID card is required according to request contents of the services, thereby making the system complicated, and the operability and convenience of the system are deteriorated:

The present invention has been achieved in view of the above problems, and an object of the present invention is to enable provision of appropriate information used by railroad users according to a running status or the like of a train, and to provide an information providing service system for railroad users with improved convenience when the railroad users acquire information.

Means for Solving Problem

In order to solve the above problems, and in order to achieve the above object, in an information providing service system for railroad users, the system of the present invention includes a plurality of train-information management devices mounted on each of a plurality of cars constituting a train to manage train information in association with each other, a ground system connected to each of the train-information management devices via train-to-ground wireless communication so that information provision to each of the train-information management devices becomes possible, an in-car server mounted on the train and connected to each of the train-information management devices, an electronic ticket that is held by a passenger on the car, that stores ticket information therein, and that includes a display unit and a wireless communication function enabling wireless communication with the in-car server, wherein by wirelessly communicating with the in-car server by using the electronic ticket, the passenger acquires train information held by the train-information management device or information held by the ground system based on the train information held by the train-information management device, so that the passenger can confirm the acquired information by the display unit.

Effect of the Invention

According to the present invention, appropriate information required by passengers can be provided individually for each of the passengers corresponding to a running position of a train by using train information held by a train-information management device.

Furthermore, by using functions included in an electronic ticket or the like, passengers can be provided with services by using the electronic ticket, the system is simplified, and the operability and convenience are improved.

Figure 1:
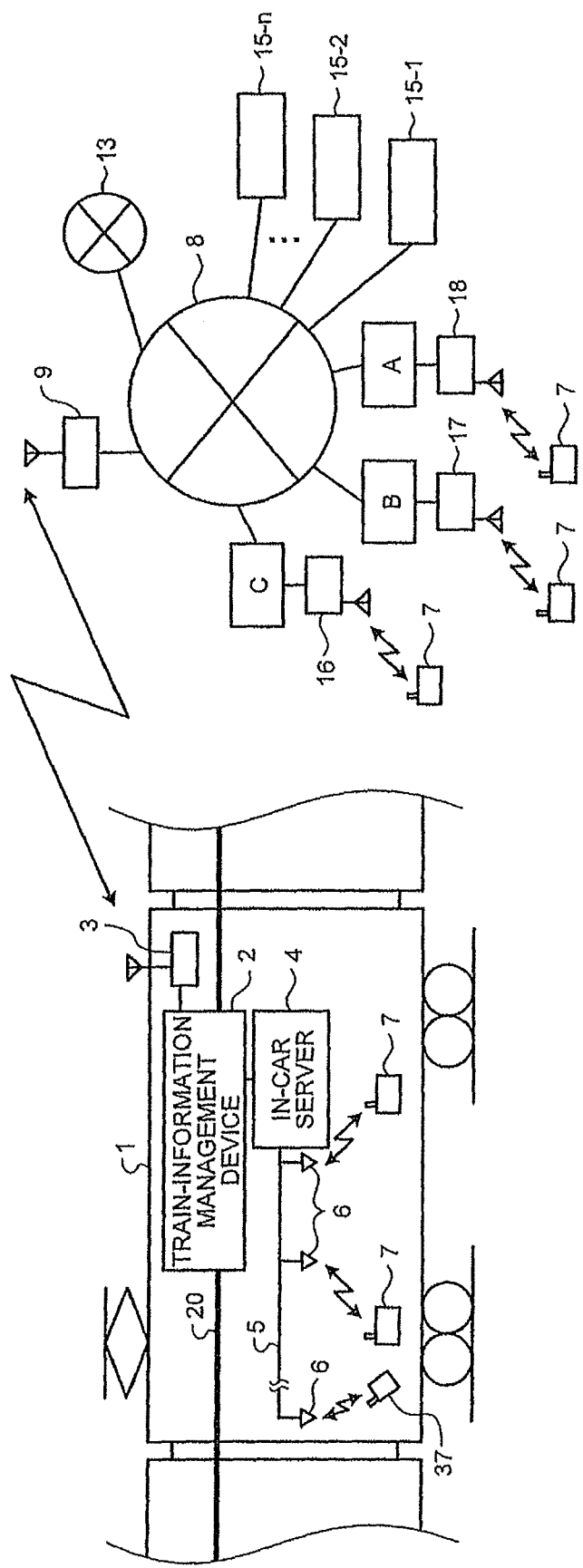
FIG. 1 depicts an overall configuration of a service providing system for railroad users according to a first embodiment.

EXPLANATIONS OF LETTERS OR NUMERALS 1 car
2 train-information management device
3, 6, 9, 16, 17, 18 transmitting/receiving device
4 in-car server
5, 20 transmission path
7 IC ticket
8 ground system 13 Internet
15-1 to 15-*n* server
30 display device
31 noncontact IC-card function
32 wireless LAN function
33 IP phone function
34 deposit (charge) function
35 game function
36 input function
37 portable terminal
40 display example

BEST MODE(S) FOR CARRYING OUT THE INVENTION

Exemplary embodiments of an information providing service system for railroad users according to the present invention will be explained below in detail with reference to the accompanying drawings. The present invention is not limited to the embodiments.

First Embodiment

FIG. 1 depicts an overall configuration of a service providing system for railroad users according to a first embodiment. In FIG. 1, a car 1, which is one of a plurality of cars of a train that is constituted by the cars, is shown. A train-information management device 2 is mounted on the car 1. The train-information management device 2 is mounted on each of the cars, and performs management and processing of train information or car information (train traffic information such as running position of the train, speed, car number, stops, and arrival time, monitoring information of various on-board devices such as a door opening/closing command, control information and the like). In more detail, the train-information management device 2 collectively manages the train information regarding power running, a braking command, a door opening/closing command, calculations of occupancy of each car, air-conditioning and room temperature control, broadcasting in car, interior light control, inspection before departure from depot, device fault control and the like. The train-information management device 2 provided in each car is connected with each other by a transmission path 20 and operates in cooperation with each other.

An in-car server 4 is connected to the train-information management device 2, and a plurality of transmitting/receiving devices 6 for in-car wireless communication is arranged in a transmission path 5 connected to the in-car server 4. The transmitting/receiving devices 6 can wirelessly communicate with an IC ticket 7, which is an electronic ticket with a wireless communication function held by a passenger on the car 1, via a wireless LAN, for example. The in-car server 4 manages transfer of information between the train-information management device 2 and the IC ticket 7. As described later, by operating the IC ticket 7 to connect to the in-car server 4 via a wireless LAN, passengers can receive car information held by the train-information management device 2 or information providing services based on the car information held by the train-information management device 2. The connection mode of the passenger to the in-car server 4 by the IC ticket 7 includes a mode of performing wireless communication by holding the IC ticket 7, for example, with a noncontact IC card function over a card reader (so-called touch-type). The transmitting/receiving device 6 is also wirelessly communicable with a portable terminal 37 with a wireless communication function held by a conductor on the car 1. The conductor operates the portable terminal 37 at the time of doing his job on the car or providing various services for passengers, to acquire car information held by the train-information management device 2 or information providing services based on the car information via a wireless LAN, which can be used for doing his job. The information providing service can be acquired by holding the portable terminal 37 over a card reader to perform (so-called touch-type) wireless communication, similarly to the connection to the in-car server 4 by the IC ticket 7.

Figure 2:
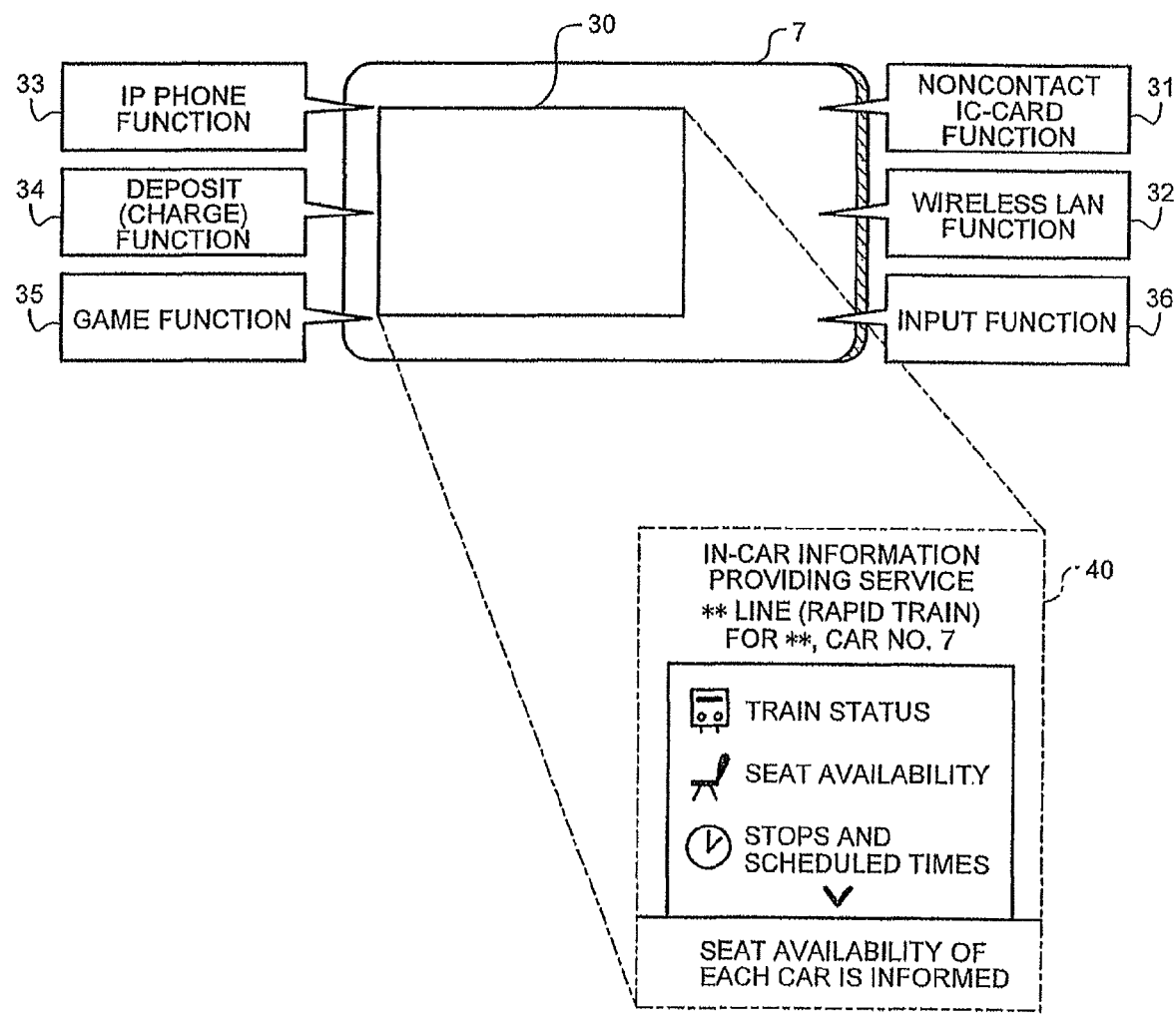
FIG. 2 is an example of a function incorporated in an IC ticket.

A configuration of the IC ticket 7 is explained. FIG. 2 is an example of a function incorporated in the IC ticket 7. The IC ticket 7 includes a display device 30 formed of, for example, a liquid crystal screen, with an IC card including ticket information stored therein being a main body of the IC ticket 7. The ticket information includes, for example, boarding/destination information such as boarding station information and destination station information, and train information such as a train set number (train name), car number, and reserved seat. ID information for specifying its holder and the like are stored in the IC ticket 7. The IC ticket 7 further includes various functions such as a noncontact IC-card function 31, a wireless LAN function 32, an IP phone function 33, a deposit (charge) function 34, a game function 35, and an input function 36.

The noncontact IC-card function 31 enables read/write of a card by bringing the IC ticket 7 into contact with a card reader/writer at a ticket gate, and a ticket checking operation can be simplified as compared with a conventional method in which a passenger inserts a ticket into a device.

The deposit (charge) function 34 enables deposit (charge) of a predetermined amount of money beforehand, so that payment of purchase money of a ticket and the like at a ticket gate or an automatic ticket-vending machine, payment of a fare adjustment amount at an exit fare machine or the like can be made by automatic deduction. An electronic money function that can be used for payment for goods at a shop inside or outside of a station yard can be added by using the deposit (charge) function 34. The IC ticket 7 can be repeatedly used by depositing (charging).

The wireless LAN function 32 realizes wireless LAN communication between the IC ticket 7 and the train-information management device 2. Therefore, an interface for wireless LAN communication, an antenna module and the like are incorporated in the IC ticket 7. An existing wireless communication system other than a wireless LAN can be also used as the wireless communication system.

The IP phone function 33 is a function by which users of the IC ticket 7 can use an IP phone by using wireless LAN communication, and call charge and the like can be deducted from the charged amount.

The game function 35 enables passengers to play games. For example, by activating game software incorporated beforehand and displaying an image of a game and the like on the display device 30, the passengers can play the game by using their free time on the train. The game function 35 is an example of an entertainment function, and a function of watching television and providing electronic books, ring tones, quizzes, daily-life information or the like can be provided.

The input function 36 provides an input unit at the time of operating the IC ticket 7 or inputting information, and for example, the input function 36 can be realized by a touch panel provided on the display device 30.

The portable terminal 37 with a wireless communication function held by a conductor can include a display unit, a wireless LAN function, an IP phone function, an input function and the like, as well as various functions for assisting conductor's job such as on board ticket examinations, ticket sales, fare adjustment with a change of passenger's destination, and providing information of connecting trains.

The car 1 includes a transmitting/receiving device 3 that realizes information communication with the ground side. The transmitting/receiving device 3 is sequentially connected to the train-information management device 2, the in-car server 4, and the transmitting/receiving devices 6, and then it is connected to the IC ticket 7 and the portable terminal 37 via a wireless LAN. The transmitting/receiving device 3 can be provided in each car and connected to the train-information management device 2 mounted on each car, or it can be provided only in a specific car and connected to the train-information management device 2 provided in each car via a transmission line.

A ground system 8 held by a railroad company to manage traffic control of trains, operation commands and the like, and formed of a ground infrastructure including networks, servers and the like is established on the ground side. A transmitting/receiving device 9 on the ground side is provided in the ground system 8, to transfer information with the transmitting/receiving device 3, which is the transmitting/receiving device on a train side, by terrestrial communication or satellite communication. The ground system 8 is connected to the external Internet 13.

A plurality of (for example, n) servers 15-1 to 15-n are connected to the ground system 8. These servers are various servers used for providing services in response to requests from railroad users such as passengers, and include, for example, an Internet server, a mail server, a server for seat reservations, a server for providing most appropriate route information in response to a route search request from a passenger, a server for providing real-time information such as news, and a server for providing advertisement information, in addition to a server related to train traffic control and operation commands.

The ground system 8 is connected to systems of respective stations via a network. In FIG. 1, for example, systems of stations A, B, and C are respectively connected to the ground system 8. Further, a transmitting/receiving device 18 is provided at the station A, so that wireless communication with the IC ticket 7 held by railroad users in a station yard or on a platform can be performed, for example, via a wireless LAN. Similarly, a transmitting/receiving device 17 is provided at the station B and a transmitting/receiving device 16 is provided at the station C. The transmitting/receiving devices 16 and 17 can wirelessly communicate with the IC ticket 7 held by railroad users via a wireless LAN in a station yard or on a platform. The connection mode between the IC ticket 7 and the transmitting/receiving device at a station includes a mode for performing (so-called touch-type) wireless communication by holding the IC ticket 7, for example, with a noncontact IC card function held by a railroad user over a card reader.

An operation of the present embodiment is explained next. In the present embodiment, when passengers, conductors, other railroad users, and the railroad company try to acquire required information via the IC ticket 7 or portable terminal 37 with a wireless communication function, most appropriate information is individually provided for each of the passengers corresponding to, for example, a running position of a train by using car information held by the train-information management device 2. That is, for example, information managed by a server of the ground system 8 is not directly provided, but information is associated with car information held by the train-information management device 2, thereby providing an advanced service more suitable for passenger's needs.

A specific example of the information providing service is explained below. In the present embodiment, a case that information provision based on car information held by the train-information management device 2 is performed unidirectionally from the ground system 8 to a holder of the IC ticket 7 or of the portable terminal 37 is explained. A case that information provision is performed bi-directionally from a car to the ground system 8, simultaneously with information provision from the ground system 8, such that, for example, information input by a conductor from his portable terminal or other pieces of car information are reflected on information held by the ground system 8 will be explained in a second embodiment.

A case that a passenger receives provision of real-time information relating to boarding and destination stations on a car is explained first. When the passenger purchases a ticket by using the IC ticket 7 before boarding, the ticket information is stored in the IC ticket 7. The ticket information includes names of the boarding station and the destination station, for example.

When the passenger is on a train and turns on a power switch of the IC ticket 7 on the car 1, the IC ticket 7 and the transmitting/receiving device 6 start communication therebetween using a wireless LAN, and ticket information held by the IC ticket 7 is transmitted to the train-information management device 2 via the in-car server 4. Alternatively, a wireless card reader (not shown) is arranged on a seat, and the passenger seated on the seat sets the IC ticket 7 in the wireless card reader, thereby transmitting ticket information read by the wireless card reader to the train-information management device 2 by wireless communication via the in-car server 4.

Subsequently, the train-information management device 2 transmits the ticket information and related car information to the ground system 8 via the transmitting/receiving devices 3 and 9. The related car information is information held by the train-information management device 2, and includes a running position of the train at the time, the present time or the like.

These pieces of information transmitted from the train-information management device 2 to the ground system 8 are transmitted to a predetermined server (any one of the servers 15-1 to 15-n) provided in the ground system 8, and the predetermined server extracts real-time information relating to the relevant boarding and destination stations (for example, arrival time, transfer information, and accident information) together with information stored in the ground system 8, ticket information, and car information held by the train-information management device 2. At this time, most appropriate information is selected according to individual ticket information of each passenger. The extracted real-time information is transmitted to the IC ticket 7 held by the passenger sequentially via the transmitting/receiving device 9, the transmitting/receiving device 3, the train-information management device 2, and the in-car server 4. The real-time information is displayed on the display unit 30 of the IC ticket 7, and thus the passenger can acquire required appropriate information. The real-time information can include news information such as emergency earthquake information and weather information in addition to individual information.

Figure 3:
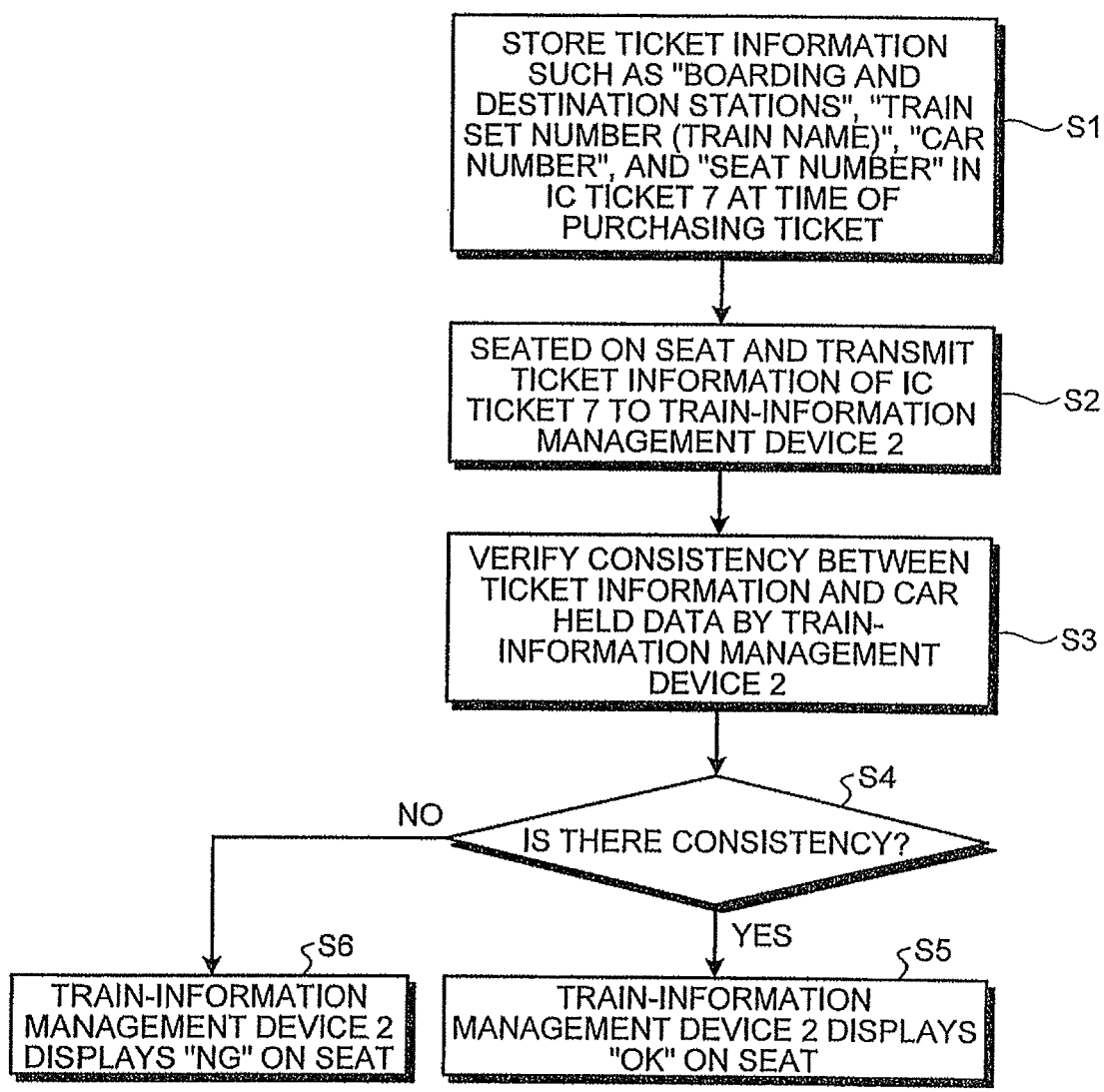
FIG. 3 is a flowchart of an example of an information providing service according to the first embodiment.

As another specific example of the information providing service, there is explained an example in which on board ticket examinations are not required and it can be easily found out by a passenger seated on a reserved seat whether it is a correct reserved seat. FIG. 3 is a flowchart of an example of the information providing service according to the present embodiment, in which in-car ticket examinations are not required and it can be easily found out by a passenger seated on a reserved seat whether it is a correct reserved seat.

First, as shown in FIG. 3, the ticket information such as "boarding and destination stations", "train set number (train name)", "car number", and "seat number" is stored in the IC ticket 7 at the time of ticket purchase (Step S1).

The passenger is then seated on a seat and transmits ticket information held by the IC ticket 7 to the train-information management device 2 (Step S2). The transmission method of ticket information to the train-information management device 2 includes, for example, a method in which the passenger brings the IC ticket 7 into contact with a touching machine (not shown) provided on the seat to wirelessly transmit the ticket information held by the IC ticket 7 and the seat information held by the touching machine via the touching machine, or a method in which the IC ticket 7 reads seat information from a touching machine and wirelessly transmits the read seat information and ticket information by using a wireless LAN function.

The train-information management device 2 then verifies consistency between ticket information and car held data held by the train-information management device 2 (Step S3). For example, it is verified by checking the ticket information whether the corresponding passenger is allowed to be seated on the seat with respect to the running position of the train.

It is determined whether the ticket information and the car held data are consistent with each other (Step S4), and when the information and the data are consistent with each other, the train-information management device 2 displays "OK" via a display lamp of the seat (Step S5), for example. When the information and the data are not consistent with each other, the train-information management device 2 displays "NG" (Step S6).

In this way, a passenger seated on a reserved seat can easily know whether it is a correct seat, and when the passenger is correctly seated on a reserved seat, because the information is stored in the train-information management device 2, any ticket examination is not required. Accordingly, a conductor does not need to confirm tickets for each seat, and does not need to wake up a passenger asleep on a seat to examine his ticket.

As another specific example of the information providing service, there is a mode that the train-information management device 2 reads boarding and destination station information from ticket information held by the IC ticket 7, and reads advertisement information around the boarding and destination stations from an advertisement server (any one of the servers 15-1 to 15-n) provided in the ground system 8 to transmit the information to the IC ticket 7, so that the advertisement information can be displayed on the display unit 30. The advertisement information can be, for example, information which is only available on the train, information on limited time sale targeting railroad users, or event information.

Because the train-information management device 2 also controls air-conditioning, the train-information management device 2 can provide outside air temperature information at the running position of the train in addition to the interior temperature for passengers holding the IC ticket 7.

A specific example of the information providing service for railroad users who hold the IC ticket 7 in a station yard or on a platform is explained next. Car information held by the train-information management device 2 mounted on the car 1 is transmitted to the ground system 8 via the transmitting/receiving devices 3 and 9, together with car information in other cars connected to the car 1, and is transferred to a train information server connected to the ground system 8 to be stored and managed therein. The train information server is one of the servers 15-1 to 15-n, and manages the car information transmitted from respective trains on the route for each train.

A railroad user having purchased a ticket by using the IC ticket 7 from a ticket-vending machine can access the train information server by using a wireless LAN function of the IC ticket 7 in a station yard or on a platform to obtain car information of the user's train before boarding. For example, when a railroad user in a yard of a station A purchases a ticket, ticket information held by the IC ticket 7 is transmitted to a train information server connected to the ground system 8 through wireless LAN communication between the IC ticket 7 and the transmitting/receiving device 18. The train information server having received the ticket information can obtain real-time information of the train which the passenger is to be on board based on the car information of the train which the passenger is to be on board and the traffic information such as train timetable information, based on the ticket information.

A specific example of the information providing service according to the present embodiment has been explained above. In FIG. 2, a display example 40 of information providing contents displayed on the display unit 30 is shown in an enlarged manner. The display contents can be displayed in a selected language other than Japanese, thereby enabling to provide a barrier-free service to foreigners who cannot read Japanese.

According to the present embodiment, by using information held by the train-information management device 2, advanced traffic information, which cannot be used by conventional techniques, can be used, so that appropriate information required by passengers can be provided according to the running position of the train, and individual services can be provided for each passenger.

Passengers can obtain various services by using the IC ticket 7, by utilizing various functions included in the IC ticket 7. On the other hand, conventionally, an ID card or the like is required in addition to an in-car terminal or a portable terminal according to service contents. Therefore, according to the present embodiment, the system is simplified and the operability and convenience are improved. Furthermore, in a mode using an in-car terminal arranged in a car, the number of available terminals is limited, and passengers who cannot sit on a seat may not be able to receive the services. However, in the present embodiment, passengers only need to hold the IC ticket 7 individually, and thus such problems do not occur.

By using a wireless network held and managed by a railway company, which is not a general public line (for example, a line of a mobile phone held by a passenger) for wireless communication via the IC ticket 7 or the portable terminal 37, a closed network or closed information providing space is formed, thereby enabling to ensure a safe and secure network without information leakage to outside. For example, a situation such that personal information stored in the IC ticket 7 is read by a third party can be avoided.

According to the present embodiment, a system infrastructure is provided, by which the railway company can create a new service. That is, the present embodiment is useful for establishing a new business model of a railroad company, such that information provision only available in a station yard is performed.

Railroad companies can provide services on the cost front to passengers by offering free or low communication fee when they perform communication by using the IC ticket 7.

Pieces of information specific to each train and route can be provided, and thus the service range to passengers is broadened.

When a train crew such as a conductor and a driver inputs his own ID to the portable terminal 37 held by the crew, the input information is transmitted to the train-information management device 2, for example, via a wireless LAN, and further to the ground system 8 together with car information such as a position of a running train and a reception time of the information, which can be used as information for working hour management or the like. In this manner, the car information can be used for business management and working hour management of railroad companies.

Various information providing services using the present embodiment can be provided other than the examples explained above. For example, when a car trouble or accident has occurred, trouble information or accident information can be provided to passengers from the train-information management device 2 via the IC ticket 7. For example, by providing occupancy information for each car to passengers from the train-information management device 2 via the IC ticket 7, the passengers can move to a car with lower occupancy to spend a comfortable time on the car.

Second Embodiment

In the first embodiment, there has been explained a case that information based on car information held by the train-information management device 2 is provided unidirectionally, mainly from the ground system 8 to a holder of the IC ticket 7 or the portable terminal 37. In a second embodiment, a case of performing bi-directional information provision is explained.

Figure 4:
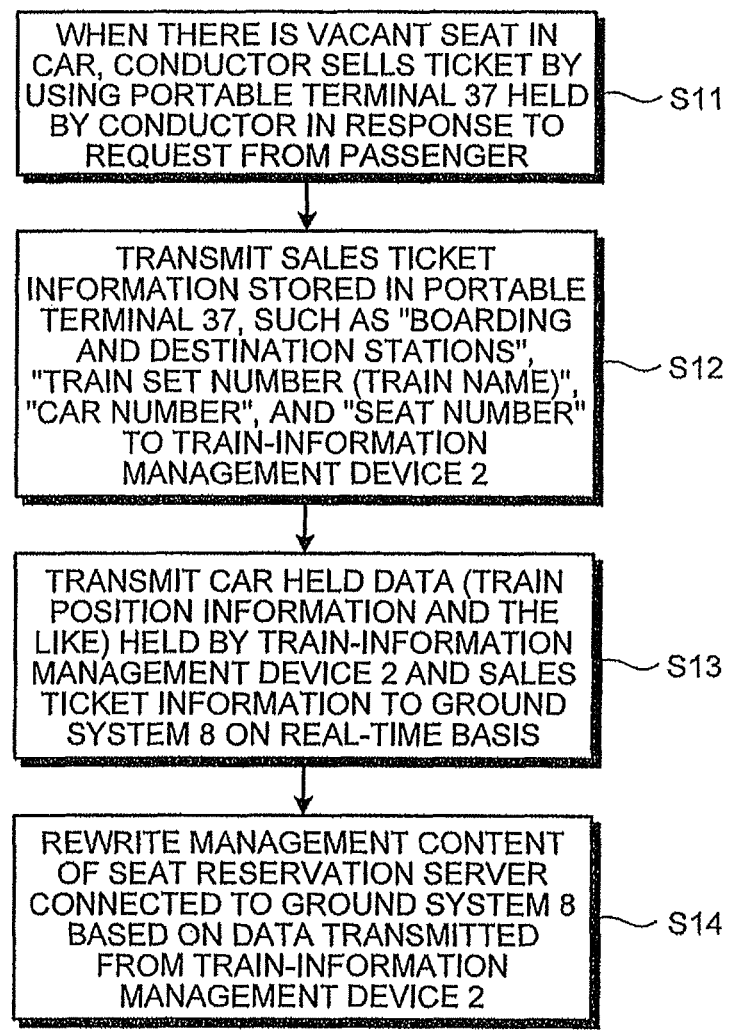
FIG. 4 is a flowchart of an example of an information providing service according to a second embodiment.

FIG. 4 is a flowchart of an example of the information providing service according to the present embodiment. FIG. 4 explains an efficient sales method of reserved seats, in a case when there is a vacant seat in reserved seats in a train and there is a passenger who wishes to purchase the reserved seat on the train.

As shown in FIG. 4, as well as FIG. 1, when there is a vacant seat in a car, a conductor sells a ticket by using the portable terminal 37 held by the conductor in response to a request of a passenger (Step S11).

Sales ticket information stored in the portable terminal 37 ("boarding and destination stations", "train set number (train name)", "car number", "seat number" and the like) is then transmitted to the train-information management device 2 (Step S12).

The car held data (train position information and the like) held by the train-information management device 2 and the sales ticket information are transmitted to the ground system 8 on a real-time basis (Step S13). At this time, a wireless data network held by a railway company is used for wireless communication between the transmitting/receiving device 3 of the car 1 and the transmitting/receiving device 9 of the ground system 8, thereby reducing the running cost of communication to zero.

Next, management contents of a seat reservation server (any one of the servers 15-1 to 15-$n$) connected to the ground system 8, which manage seat reservation information, are rewritten based on data transmitted from the train-information management device 2 (Step S14). That is, by transmitting information of a sold seat to a ticket sales system on the ground via the train-information management device 2, "actual remaining seat information" can be ascertained.

In conventional methods, because information of seats sold by a conductor on a car is not reflected on the ground system 8, the vacant seat cannot be sold efficiently due to occurrence of double bookings or the like. Further, only by transmitting ground sales data to the train, unused vacant seats are wasted.

According to the present embodiment, by transmitting sales information on the train to the ground system 8 via the train-information management device 2, the sales mode on the train can be associated with the sales mode of the ground system 8, and effective sales of reserved seats can be realized.

INDUSTRIAL APPLICABILITY

The present invention is useful as an information providing service system for railroad users, railroad companies or the like.

The invention claimed is:

1. An information providing service system for railroad users, the system comprising:
   train-information management devices mounted on each of a plurality of cars constituting a train, to manage train information including train traffic information, train position information, and monitoring information of on-board devices in association with each other;
   an in-car server mounted on the train and connected to each of the train-information management devices so as to manage transfer of information;
   a transmitting/receiving device mounted on the train, arranged in a transmission path connected to the in-car server, and capable of performing wireless communication in the train;
   an IC card that is held by a passenger on the car, stores ticket information including boarding/destination station information of the passenger therein, includes a wireless communication function capable of performing wireless communication with the transmitting/receiving device, and includes a display unit capable of displaying information received by the wireless communication function; and
   a seat communication device associated with a seat on a car and capable of communicating with the IC card, wherein
   the IC card transmits the ticket information to the transmitting/receiving device by the wireless communication function,
   each of the train-information management devices receives the ticket information received by the transmitting/receiving device and sequentially transmitted via the transmission path and the in-car server, and
   at least one of the seat communication device and the IC card is configured to transmit the ticket information and associated seat information to at least one of the train-information management devices, and wherein the at least one train-information management device determines whether the seat information and the ticket information are consistent with each other, and outputs a notification based on the determination.

2. An information providing service system for railroad users, the system comprising:
   train-information management devices mounted on each of a plurality of cars constituting a train, to manage train information including train traffic information, train position information, and monitoring information of on-board devices in association with each other;
   an in-car server mounted on the train and connected to each of the train-information management devices so as to manage transfer of information;
   a transmitting/receiving device mounted on the train, arranged in a transmission path connected to the in-car server, and capable of performing wireless communication in the train; and
   an IC card that is held by a passenger on the car, stores ticket information including boarding/destination station information of the passenger therein, includes a wireless communication function capable of performing wireless communication with the transmitting/receiving device, and includes a display unit capable of displaying information received by the wireless communication function, wherein when a car trouble or a car accident has occurred, the IC card transmits the ticket information to the transmitting/receiving device by the wireless communication function, each of the train-information management devices receives the ticket information received by the transmitting/receiving device and sequentially transmitted via the transmission path and the in-car server, and then outputs car trouble information or car accident information as the train information to the in-car server, and the IC card receives, by the wireless communication function, the car trouble information or the car accident information output by the in-car server and transmitted by the transmitting/receiving device via the transmission path, and causes the display unit to display the received car trouble information or the received car accident information.

3. An information providing service system for railroad users, the system comprising:

train-information management devices mounted on each of a plurality of cars constituting a train, to manage train information including train traffic information, train position information, and monitoring information of on-board devices in association with each other;

an in-car server mounted on the train and connected to each of the train-information management devices so as to manage transfer of information;

a first transmitting/receiving device mounted on the train, arranged in a transmission path connected to the in-car server, and capable of performing wireless communication in the train;

an IC card that is held by a passenger on the car, stores ticket information including boarding/destination station information of the passenger therein, includes a wireless communication function capable of performing wireless communication with the first transmitting/receiving device, and includes a display unit capable of displaying information received by the wireless communication function;

a second transmitting/receiving device mounted on the train, connected to the train-information management device, and capable of performing wireless communication with a ground side;

a third transmitting/receiving device mounted on the ground side and capable of performing wireless communication with the second transmitting/receiving device; and a ground server that is connected to the third transmitting/receiving device and holds information which can be always provided to the in-car server even when a car trouble or a car accident has occurred, wherein the IC card transmits the ticket information to the first transmitting/receiving device by the wireless communication function;

the train-information management device receives the ticket information received by the first transmitting/receiving device and sequentially transmitted via the transmission path and the in-car server, and then transmits the train position information as the ticket information and the train information to the third transmitting/receiving device by the second transmitting/receiving device, the ground server selects, corresponding to destination station information and the train position information received by the third transmitting/receiving device, transfer information from the information held by the ground server, and transmits the transfer information to the second transmitting/receiving device by the third transmitting/receiving device via wireless communication with the second transmitting/receiving device, the train-information management device outputs the transfer information received by the second transmitting/receiving device to the in-car server, and the IC card receives, by the wireless communication function, the transfer information output by the in-car server and transmitted by the first transmitting/receiving device via the transmission path, and then causes the display unit to display the received transfer information.

* * * * *